(12) United States Patent
Muraoka et al.

(10) Patent No.: US 8,789,819 B2
(45) Date of Patent: Jul. 29, 2014

(54) FLUID-FILLED TYPE ACTIVE VIBRATION DAMPING DEVICE

(75) Inventors: Mutsumi Muraoka, Nagakute (JP); Satoshi Umemura, Gifu (JP); Hironori Koyama, Kasugai (JP)

(73) Assignee: Tokai Rubber Industries, Ltd., Aichi (JP)

( * ) Notice: Subject to any disclaimer, the term of this patent is extended or adjusted under 35 U.S.C. 154(b) by 60 days.

(21) Appl. No.: 13/414,882

(22) Filed: Mar. 8, 2012

(65) Prior Publication Data

US 2012/0242020 A1 Sep. 27, 2012

(30) Foreign Application Priority Data

Mar. 25, 2011 (JP) .................................. 2011-067094

(51) Int. Cl.
 *F16F 7/00* (2006.01)
 *F16F 5/00* (2006.01)
(52) U.S. Cl.
 USPC .................................. 267/141.7; 267/140.14
(58) Field of Classification Search
 USPC ............... 267/140.11, 140.13–140.15, 141.2, 267/141.3–141.7
 See application file for complete search history.

(56) References Cited

U.S. PATENT DOCUMENTS

| | | | | |
|---|---|---|---|---|
| 5,601,280 | A * | 2/1997 | Nagaya et al. | 267/140.14 |
| 6,406,010 | B1 * | 6/2002 | Yano et al. | 267/140.14 |
| 6,994,332 | B2 * | 2/2006 | Goto et al. | 267/140.13 |
| 7,810,798 | B2 * | 10/2010 | Ichikawa et al. | 267/140.14 |
| 2007/0222128 | A1 * | 9/2007 | Ichikawa et al. | 267/140.14 |
| 2009/0079118 | A1 * | 3/2009 | Muraoka et al. | 267/140.14 |
| 2010/0301530 | A1 * | 12/2010 | Koyama et al. | 267/140.14 |
| 2011/0180980 | A1 * | 7/2011 | Urayama et al. | 267/140.14 |

FOREIGN PATENT DOCUMENTS

JP 2005-282821 10/2005
JP 2007-252017 9/2007

* cited by examiner

*Primary Examiner* — Vishal Sahni
(74) *Attorney, Agent, or Firm* — Greenblum & Bernstein P.L.C.

(57) ABSTRACT

A fluid-filled type active vibration damping device including: a first mounting member; a second mounting member; a main rubber elastic body connecting the first and second mounting members; a fluid chamber; an oscillation member that partially defines a wall of the fluid chamber; an actuator having an output shaft, the output shaft being connected to the oscillation member; a connecting member that interconnects the oscillation member and the output shaft at one point with the oscillation member superposed against a projecting distal end of the output shaft; and an abutting portion provided by superposed faces of the oscillation member and the output shaft being positioned in abutment with each other at an outer peripheral side of a connected section where the oscillation member and the output shaft are interconnected by the connecting member.

6 Claims, 4 Drawing Sheets

FLUID-FILLED TYPE ACTIVE VIBRATION DAMPING DEVICE

INCORPORATED BY REFERENCE

The disclosure of Japanese Patent Application No. 2011-067094 filed on Mar. 25, 2011 including the specification, drawings and abstract is incorporated herein by reference in its entirety.

BACKGROUND OF THE INVENTION

1. Field of the Invention

The present invention relates generally to a fluid-filled type vibration damping device that utilizes vibration damping effect on the basis of the flow action of the fluid filling a fluid chamber. More particularly, the present invention pertains to a fluid-filled type active vibration damping device capable of exhibiting active vibration damping effect by exerting the oscillation force on a fluid chamber by means of an actuator.

2. Description of the Related Art

There have been known fluid-filled type vibration damping devices including a fluid chamber filled with a non-compressible fluid and capable of attaining vibration damping effect by utilizing flow behavior of the fluid induced during input of vibration. The fluid-filled type vibration damping device has a construction wherein a first mounting member and a second mounting member are elastically connected by a main rubber elastic body, and the main rubber elastic body partially defines a wall of the fluid chamber, in order to apply vibration to the fluid chamber. Also, in recent years, with the aim of realizing more enhanced vibration damping characteristics, proposed is an active type fluid-filled vibration damping device furnished with an electromagnetic or other actuator and able to actively control pressure in the fluid chamber (see Japanese Unexamined Patent Publication No. JP-A-2007-252017).

The fluid-filled type active vibration damping device as disclosed in Japanese Unexamined Patent Publication No. JP-A-2007-252017 includes an oscillation member that partially defines a wall of the fluid chamber, and the oscillation member is connected to an output shaft that is secured to a movable member of the actuator. With this arrangement, the oscillation force of the actuator is adapted to be exerted on the oscillation member via the output shaft. The oscillation member and the output shaft are interconnected at one point in the following way, for example. The oscillation member has a round tubular shape with a bottom and includes a swage hole that perforates its diametrical center section, while the output shaft includes a swage projection that projects on the center axis of the output shaft. The swage projection of the output shaft is inserted into the swage hole of the oscillation member, and then the upper end portion of the swage projection undergoes diameter expansion deformation so as to be secured by swaging to the rim of the opening of the swage hole.

However, since the connected section of the oscillation member and the output shaft is subjected to oscillations repeatedly from the actuator, more enhanced securing force may be required with the aim of obtaining durability over an extended period. In such cases, whereas the securing force in the vertical direction is obviously required, the securing force in the rotational direction may be appreciably required in order to avoid relative rotation of the oscillation member and the output shaft. Specifically, the connecting structure in which the oscillation member and the output shaft are interconnected only at one point in the diametrical center retains a relatively small securing force in the rotational direction. Therefore, especially in a case where smoothness of the superposed faces of the oscillation member and the output shaft is high and the securing force in the rotational direction based on the frictional force is small or the like, obtaining a large securing force in the rotational direction without complicating the structure has been required.

SUMMARY OF THE INVENTION

It is therefore one object of this invention to provide a fluid-filled type active vibration damping device of novel construction which is able to obtain a larger securing strength at the connected section of the oscillation member that partially defines a wall of the fluid chamber and the output shaft of the actuator.

Specifically, a first mode of the present invention provides a fluid-filled type active vibration damping device including: a first mounting member; a second mounting member; a main rubber elastic body connecting the first mounting member and the second mounting member; a fluid chamber filled with a non-compressible fluid and adapted to receive input of vibration; an oscillation member that partially defines a wall of the fluid chamber; an actuator including an output shaft, the output shaft being connected to the oscillation member so that oscillation force generated by the actuator is adapted to be exerted from the oscillation member to the fluid chamber; a connecting member that interconnects the oscillation member and the output shaft at one point with the oscillation member superposed against a projecting distal end of the output shaft; and an abutting portion provided by superposed faces of the oscillation member and the output shaft being positioned in abutment with each other at an outer peripheral side of a connected section where the oscillation member and the output shaft are interconnected by the connecting member.

The fluid-filled type active vibration damping device of construction according to the first mode has a construction in which the oscillation member and the output shaft are connected at one point by the connecting member. In this construction, the superposed faces of the oscillation member and the output shaft are positioned in abutment with each other at a position away from the connected one point to the outer peripheral side. With this arrangement, owing to frictional resistance or the like at the abutting portion, it is possible to avoid relative rotation of the oscillation member and the output shaft centered on the connected section, thereby attaining securing force more effectively.

In particular, since the abutting portion is provided at a position away from the connected section to the outer peripheral side, a large abutting surface area of the oscillation member and the output shaft can be obtained at the abutting portion. Thus, the oscillation member and the output shaft are securely interconnected in a stable manner without play or the like. Additionally, by providing the abutting portion at the outer peripheral side of the connected section, the oscillation member and the output shaft will be more effectively prevented from relative rotation in the circumferential direction, thereby being positioned in the rotational direction.

While no particular limitation is imposed as to the connecting member, a swage-fastening structure, a press-fit-fastening structure, a screw-fastening structure or the like may be employed.

A second mode of the present invention provides the fluid-filled type active vibration damping device according to the first mode wherein the oscillation member includes a swage hole that perforates the oscillation member in an axial direction of the output shaft; the output shaft includes a swage projection that projects from the superposed face of the output shaft against the oscillation member outward in the axial direction; and the connecting member is constituted such that the swage projection inserted into the swage hole is secured by swaging to a rim of an opening of the swage hole in the axial direction.

According to the second mode, the swage projection that projects from the output shaft is secured by swaging to the rim of the opening of the swage hole that perforates the oscillation member. Thus, no special components such as screws or headed press-fit pins are necessary for connecting the oscillation member and the output shaft, and it is possible to easily connect the oscillation member and the output shaft with a small number of parts.

Besides, by employing the swage fastening in which the distal end portion of the swage projection undergoes diameter expansion deformation and is held in engagement with the rim of the opening of the swage hole, dislodgment of the swage projection from the swage hole will be avoided, thereby sufficiently obtaining securing strength of the oscillation member and the output shaft.

A third mode of the present invention provides the fluid-filled type active vibration damping device according to the first or second mode wherein the oscillation member includes: a connecting base part of circular disk shape that is superposed against the output shaft; and a reinforcing tube part of round tubular shape that surrounds the connected section and projects in a thickness direction of the connecting base part.

According to the third mode, the connecting base part of disk shape which is superposed against and connected to the output shaft is reinforced by the reinforcing tube part of round tubular shape, whereby the connecting base part is endowed with high shape stability. Thus, at the time of connecting the oscillation member and the output shaft, the connected section is prevented from getting loose due to changes in shape of the oscillation member.

Moreover, in the case where the outer peripheral side of the oscillation member is elastically supported by a support rubber elastic body, the support rubber elastic body is able to obtain sufficient bonding area by vulcanization to the oscillation member, thereby ensuring durability or the like.

A fourth mode of the present invention provides the fluid-filled type active vibration damping device according to any one of the first through third modes wherein the superposed faces of the oscillation member and the output shaft slope relatively to each other, and the abutting portion is provided such that an outer peripheral edge of one of the superposed faces of the oscillation member and the output shaft is positioned in abutment with another of the superposed faces of the oscillation member and the output shaft.

According to the fourth mode, the superposed faces of the oscillation member and the output shaft slope relatively to each other, while the diameters of the oscillation member and the output shaft are different from each other. With this arrangement, without the need to provide a special projecting portion or the like, the abutting portion can be provided such that the outer peripheral edge of the one of the oscillation member and the output shaft which has the smaller diameter is positioned in abutment with the other.

A fifth mode of the present invention provides the fluid-filled type active vibration damping device according to any one of the first through fourth modes wherein an abutting projection that projects from one of the superposed faces of the oscillation member and the output shaft towards another is provided at the outer peripheral side of the connected section, and the abutting portion is provided such that the abutting projection is positioned in abutment with the other of the superposed faces of the oscillation member and the output shaft.

According to the fifth mode, owing to the abutting projection, the oscillation member and the output shaft are able to be positioned in abutment in a more reliable manner at the abutting portion. Thus, stable securing force by the connecting member will be applied between the oscillation member and the output shaft.

According to the present invention, the oscillation member and the output shaft are interconnected at one point by the connecting member. In addition, the oscillation member and the output shaft are positioned in abutment with each other at the outer peripheral side of the connected section so as to provide the abutting portion. Therefore, relative rotation of the oscillation member and the output shaft in the circumferential direction is prevented based on frictional resistance or the like at the abutting portion, whereby the oscillation member and the output shaft are held in desired connected state.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
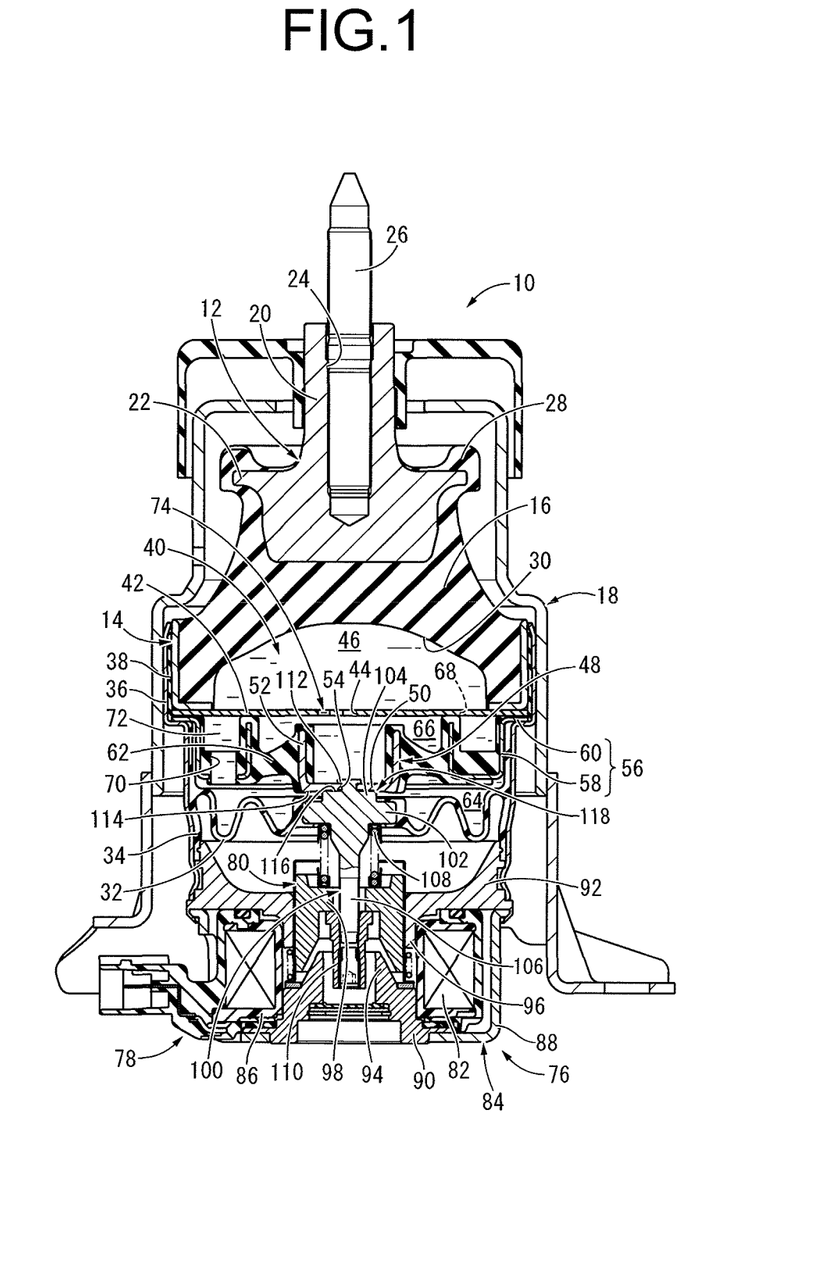
FIG. 1 is an elevational view in axial or vertical cross section of a fluid-filled type active vibration damping device in the form of an engine mount, which is constructed according to a first embodiment of the present invention.

Referring first to FIG. 1, there is depicted an automotive engine mount 10 according to a first embodiment of a fluid-filled type active vibration damping device constructed in accordance with the present invention. The engine mount 10 has a construction in which a first mounting member 12 and a second mounting member 14 are elastically connected by a main rubber elastic body 16. By the first mounting member 12 being attached to a power unit (not shown) and the second mounting member 14 being attached to a vehicle body (not shown) via an outer bracket 18 fitted externally onto the second mounting member 14, the engine mount 10 provides vibration damping linkage of the power unit on the vehicle body. In the description hereinbelow, as a general rule, the vertical direction refers to the vertical direction in FIG. 1.

Described more specifically, first mounting member 12 is a high rigidity component made of a metallic material or the like, and is integrally equipped with a main portion 20 and a flange portion 22. The main portion 20 is of generally stepped circular post shape whose upper part has a smaller diameter, and a flange portion 22 projects peripherally outward from the stepped portion of the main portion 20. In addition, the main portion 20 includes a screw hole 24 that opens onto its upper face and extends along the center axis. An implanted bolt 26 is threaded onto the screw hole 24.

Meanwhile, the second mounting member 14 is of thin-walled, large-diameter, generally round tubular shape, and its lower end projects diametrically inward so as to have an inner flanged shape. Besides, the second mounting member 14 is a high rigidity component made of a metallic material or the like similar to the first mounting member 12.

The first mounting member 12 and the second mounting member 14 are arranged in a concentric fashion, spaced apart in the diametrical and axial direction, and elastically interconnected by the main rubber elastic body 16. The main rubber elastic body 16 is of thick-walled, large-diameter, generally frustoconical shape. To the small-diameter end part of the main rubber elastic body 16 the main portion 20 of the first mounting member 12 is bonded by vulcanization, while to the outer circumferential face of the large-diameter end part of the main rubber elastic body 16 the inner circumferential face of the second mounting member 14 is juxtaposed and bonded by vulcanization.

A stopper rubber 28 is integrally formed with the main rubber elastic body 16. The stopper rubber 28 extends from the small-diameter end part of the main rubber elastic body 16 and is bonded so as to cover the outer circumferential face and the upper face of the flange portion 22 of the first mounting member 12. Accordingly, the stopper rubber 28 projects upward from the upper face of the flange portion 22.

A center recess 30 opens onto the large-diameter end part of the main rubber elastic body 16. The center recess 30 has an inverted, generally bowl shape or a generally cylindrical shape that opens downward.

A flexible film 32 is attached to the second mounting member 14. The flexible film 32 is a rubber film having a thin, generally disk shape or generally dome shape with an ample slack in the vertical direction. In addition, the flexible film 32 includes an anchor portion 34 of generally cylindrical shape integrally formed at its outer peripheral edge. The anchor portion 34 is bonded by vulcanization to a tubular mating fitting 36 of metal. The tubular mating fitting 36 has a stepped, generally round tubular shape, and to the inner circumferential face of its small-diameter portion situated at the lower side the anchor portion 34 is bonded by vulcanization. On the other hand, the large-diameter portion of the tubular mating fitting 36 situated at the upper side is externally fitted onto the second mounting member 14 and then subjected to a diameter-constricting process, thereby being mated around the second mounting member 14. In this way, the tubular mating fitting 36 is externally fastened onto the second mounting member 14. With this arrangement, the flexible film 32 is attached to the second mounting member 14 and the lower opening of the second mounting member 14 is closed off by the flexible film 32. Note that the inner circumferential face of the large-diameter portion of the tubular mating fitting 36 is covered by a seal rubber layer 38 formed of a thin-walled rubber elastic body, so that the second mounting member 14 and the tubular mating fitting 36 are fluid-tightly attached to each other via the seal rubber layer 38.

With the flexible film 32 attached to the second mounting member 14 in this way, a fluid-filled zone 40 sealed off from the outside is formed between opposed faces of the main rubber elastic body 16 and the flexible film 32, and is filled with a non-compressible fluid. While no particular limitation is imposed as to the non-compressible fluid filling the fluid-filled zone 40, preferred examples are water, alkylene glycols, polyalkylene glycols, silicone oil, and mixtures of these. In terms of efficiently achieving vibration damping action based on flow action of the fluid described later, a low-viscosity fluid having viscosity of 0.1 Pa·s or lower is especially preferred.

A partition member 42 is disposed within the fluid-filled zone 40. The partition member 42 is a thin, generally circular disk shape component, and has a plurality of through holes 44 that pierce the center section of the partition member 42 in the thickness direction.

Then, the outer peripheral edge of the partition member 42 is clasped between the axially opposed faces of the second mounting member 14 and the riser portion of the tubular mating fitting 36, so that the partition member 42 is supported by the second mounting member 14 and extends in the axis-perpendicular direction within the fluid-filled zone 40. In this way, the partition member 42 divides the fluid-filled zone 40 into upper and lower parts, and the upper part defines a pressure-receiving chamber 46 whose wall is partially defined by the main rubber elastic body 16 and is adapted to receive input of vibration.

Figure 2:
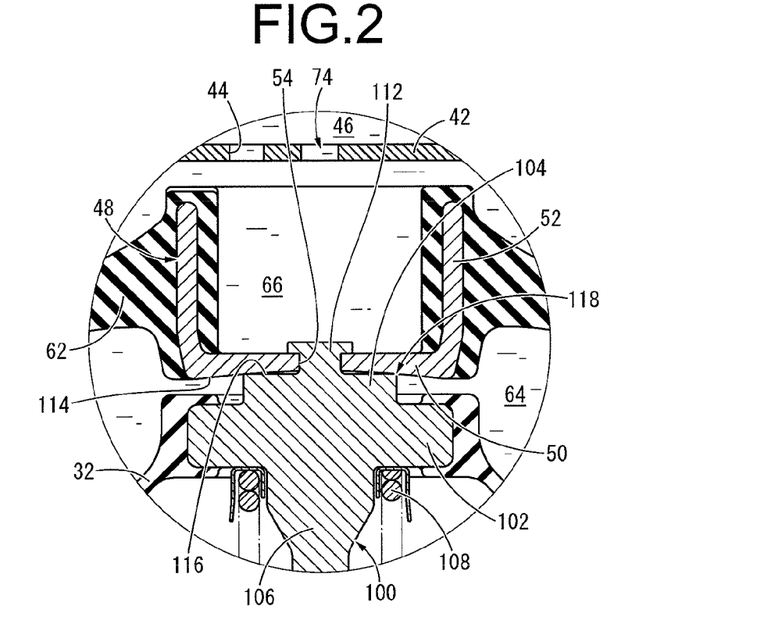
FIG. 2 is a fragmentary enlarged view of a principle part of the engine mount of FIG. 1.

An oscillation member 48 is disposed between the partition member 42 and the flexible film 32 axially opposed to each other. The oscillation member 48 integrally equipped with a connecting base part 50 of generally circular disk shape and a reinforcing tube part 52 that projects upward from the outer peripheral edge of the connecting base part 50, so as to have a small-diameter, generally cup shape or generally round tubular shape with a bottom overall. The oscillation member 48 is formed of a metallic material such as iron, with the connecting base part 50 having a thin-walled plate shape and endowed with sufficient elasticity like leaf springs with respect to bending deformation.

In addition, the oscillation member 48 includes a swage hole 54. The swage hole 54 is a circular hole that perforates the diametrical center section of the connecting base part 50 in the vertical direction (thickness direction), and has a sufficiently smaller diameter than that of the connecting base part 50. Note that the hole cross-sectional shape of the swage hole 54 is not limited to a circular shape, and may be a polygonal shape, an elliptical shape, or the like. Also, the swage hole 54 could be provided at a position away from the diametrical center section of the connecting base part 50.

Besides, an annular support member 56 is disposed to the outer peripheral side of the oscillation member 48. The support member 56 is integrally equipped with an annular groove 58 that extends annularly in the circumferential direction and a support flange 60 of annular disk shape that projects outward from the upper end of the outside peripheral wall of the annular groove 58. The annular groove 58 of the support member 56 has the inside diameter dimension larger than the outside diameter dimension of the oscillation member 48. Accordingly, the inside peripheral wall of the annular groove 58 is positioned diametrically outside the peripheral wall of the oscillation member 48 so as to be spaced apart therefrom.

Moreover, a support rubber elastic body 62 is disposed between the oscillation member 48 and the support member 56. The support rubber elastic body 62 has a generally annular disk shape and become progressively thicker towards its inner peripheral side. The inner peripheral edge of the support rubber elastic body 62 is bonded by vulcanization to the reinforcing tube part 52 of the oscillation member 48, while the outer peripheral edge bonded by vulcanization to the inside peripheral wall of the annular groove 58 of the support member 56. With this arrangement, the oscillation member 48 and the support member 56 are elastically connected by the support rubber elastic body 62. In other words, the outside peripheral portion of the oscillation member 48 is supported by the support rubber elastic body 62, and the outside peripheral portion of the oscillation member 48 is positioned on the basis of elasticity of the support rubber elastic body 62. Note that the inner peripheral edge of the support rubber elastic body 62 is bonded to both inside and outside faces of the peripheral wall of the oscillation member 48, while the outer peripheral edge of the support rubber elastic body 62 bonded to both inside and outside faces of the inside peripheral wall of the annular groove 58. Thus, the support rubber elastic body 62 takes the form of an integrally vulcanization molded component incorporating the oscillation member 48 and the support member 56.

The integrally vulcanization molded component of the support rubber elastic body 62 constructed as above is supported by the second mounting member 14 by means of the support flange 60 of the support member 56 being clasped between the partition member 42 and the riser portion of the tubular mating fitting 36 over the entire circumference. With this arrangement, the oscillation member 48 is supported by the second mounting member 14 via the support rubber elastic body 62, and is elastically disposed in a condition such that displacement in the vertical direction is allowed.

Furthermore, the integrally vulcanization molded component of the support rubber elastic body 62 divides the lower part of the fluid-filled zone 40, which is formed between the partition member 42 and the flexible film 32 axially opposed to each other, into upper and lower parts. Accordingly, an equilibrium chamber 64 whose wall is partially defined by the flexible film 32 is formed between the flexible film 32 and the integrally vulcanization molded component of the support rubber elastic body 62. Meanwhile, an intermediate chamber 66 whose wall is partially defined by the oscillation member 48 is formed between the partition member 42 and the oscillation member 48 with the support rubber elastic body 62. Needless to say, a non-compressible fluid is sealed in all of the pressure-receiving chamber 46, the equilibrium chamber 64, and the intermediate chamber 66. Besides, in the present embodiment, the pressure-receiving chamber 46 and the intermediate chamber 66 constitute a fluid chamber.

The upper opening of the annular groove 58 is covered with the partition member 42 so as to form a tunnel-like passage. The tunnel-like passage is blocked in part of the circumference by a partition wall (not shown) which is integrally formed with the support rubber elastic body 62. Accordingly, the tunnel-like passage extends for a prescribed length just short of once about the circumference. One circumferential end of the above tunnel-like passage communicates with the pressure-receiving chamber 46 via an upper communication hole 68, while the other circumferential end communicates with the equilibrium chamber 64 via a lower communication hole 70. With this arrangement, the orifice passage 72 that interconnects the pressure-receiving chamber 46 and the equilibrium chamber 64 is provided by utilizing the annular groove 58. The orifice passage 72 is tuned to low frequency on the order of 10 Hz that corresponds to an engine shake. To the interior of the annular groove 58, a rubber elastic body which is integrally formed with the support rubber elastic body 62 is bonded by vulcanization, and the cross-sectional area of the orifice passage 72 is adjusted by the configuration of the rubber elastic body.

Additionally, the pressure-receiving chamber 46 and the intermediate chamber 66 are held in communication with each other through a plurality of through holes 44 formed in the partition member 42. Accordingly, the through holes 44 provide a filter orifice 74, so that the pressure of the intermediate chamber 66 is adapted to be transmitted to the pressure-receiving chamber 46 via the filter orifice 74. The filter orifice 74 is tuned to high frequency on the order of 120 Hz that corresponds to a driving rumble or the like, namely, to higher frequency than the tuning frequency of the orifice passage 72.

An electromagnetic actuator 76 serving as an actuator is disposed below the mount body of this construction. The electromagnetic actuator 76 is disposed below the flexible film 32, and includes a stator 78 furnished with a coil 82, and a movable member 80 capable of oscillating displacement in the vertical direction with respect to the stator 78.

The stator 78 has a structure in which a yoke fitting 84 is attached around the coil 82 of cylindrical shape. Note that an insulating component 86 formed of an electrically insulative synthetic resin material is provided between the coil 82 and the yoke fitting 84, so that the periphery of the coil 82 is covered by the insulating component 86.

The yoke fitting 84 is formed of a ferromagnetic metal material and constructed by combining: an outside peripheral yoke fitting 88 of round tubular shape with a bottom that has a circular passage hole in the center of its base wall; an inside peripheral yoke fitting 90 of generally annular shape that is fitted into the passage hole of the outside peripheral yoke fitting 88; and an upper yoke fitting 92 of generally annular disk shape that is attached to the upper opening of the outside peripheral yoke fitting 88. There are formed magnetic gaps between the inner peripheral upper end of the inside peripheral yoke fitting 90 and the inner peripheral lower end of the upper yoke fitting 92 which are separated from each other, so that the inner peripheral edges of the yoke fittings 90, 92 serve as magnetic pole portions 94, 96 that provide a magnetic pole through energization of the coil 82. A caulking piece which is integrally formed with the lower outer peripheral edge of the upper yoke fitting 92 is detained by caulking against a flange portion which is provided to the upper end of the outside peripheral yoke fitting 88, whereby the upper yoke fitting 92 and the outside peripheral yoke fitting 88 are fastened together. In the present embodiment, the yoke fitting 84 including the upper yoke fitting 92 and the outside peripheral yoke fitting 88 constitutes a housing fitting of the electromagnetic actuator 76.

With respect to the stator 78 constructed as above, the lower end portion of the tubular mating fitting 36 is externally fitted onto the upper yoke fitting 92 by means of a diameter-constricting caulking so as to be connected securely thereto. Accordingly, the stator 78 of the electromagnetic actuator 76 is supported by the second mounting member 14 via the tubular mating fitting 36. Note that a sealing rubber is clasped in the connected section of the tubular mating fitting 36 and the upper yoke fitting 92. By so doing, the connected section of the tubular mating fitting 36 and the upper yoke fitting 92 is sealed, so that entry of dust or the like is prevented.

The movable member 80 is disposed in the center section of the stator 78. The movable member 80 is a component formed of a ferromagnet and having a generally cylindrical shape. An inner flanged portion 98 is integrally formed with the upper end portion of the movable member 80 and projects inward. The movable member 80 is inserted into the center hole of the upper yoke fitting 92 while being in opposition to the inner peripheral edge of the inside peripheral yoke fitting 90 in the axial direction. When the coil 82 is energized and a magnetic pole is provided to the inner peripheral edge of the inside peripheral yoke fitting 90 (the magnetic pole portion 94), attractive force toward the inside peripheral yoke fitting 90 will be exerted on the movable member 80. Accordingly, the movable member 80 undergoes displacement axially downward.

Furthermore, the movable member 80 includes an output shaft 100 attached thereto. The output shaft 100 has a small-diameter rod shape extending in the vertical direction overall, and includes an annular anchor flange 102 which is integrally formed with the medial section of the output shaft 100 and projects peripherally outward. The axially upper portion of the anchor flange 102 defines an upper cylindrical portion 104 of generally cylindrical shape having a smaller diameter than that of the anchor flange 102. Meanwhile, the axially lower portion of the anchor flange 102 defines a lower rod portion 106 of round shaft-like shape having a smaller diameter than that of the upper cylindrical portion 104 and provided with a male screw on the outside peripheral face of its lower end portion.

The lower rod portion 106 is inserted into a center hole of the movable member 80, while a coil spring 108 is interposed between the anchor flange 102 and the upper face of the movable member 80. A detent nut 110 is threaded onto the lower end portion of the lower rod portion 106 and comes into contact against the inner flanged portion 98 from below, whereby the output shaft 100 is elastically positioned and connected with respect to the movable member 80. As will be apparent from the above description, relative displacement between the anchor flange 102 as well as the upper cylindrical portion 104 of the output shaft 100 and the movable member 80 in the direction of axial separation is limited by the detent nut 110, while relative displacement therebetween in the direction of axial approach is permitted by deformation of the coil spring 108.

Besides, the output shaft 100 extending upward from the movable member 80 penetrates the diametrical center section of the flexible film 32 in the vertical direction, and the inner peripheral edge of the flexible film 32 is bonded by vulcanization to the anchor flange 102. The inner peripheral edge of the flexible film 32 is bonded by vulcanization to the anchor flange 102 over the entire circumference, so that fluidtightness of the fluid-filled zone 40 is ensured.

Moreover, the distal end of the output shaft 100 that penetrates the flexible film 32 and projects upward is secured to the oscillation member 48. Described more specifically, the output shaft 100 includes a swage projection 112 which has a small-diameter, generally circular post shape integrally formed with the upper end of the output shaft 100 and projects upward on the center axis. The swage projection 112 has a diameter which is equal to or slightly smaller than that of the swage hole 54 formed in the connecting base part 50 of the oscillation member 48, while having a projecting height dimension greater than the thickness dimension of the diametrical center section of the connecting base part 50 of the oscillation member 48. The oscillation member 48 and the output shaft 100 are vertically superposed against each other, and the swage projection 112 of the output shaft 100 is inserted into the swage hole 54 of the oscillation member 48. Then, the upper end portion of the swage projection 112 which projects above the connecting base part 50 of the oscillation member 48 undergoes diameter expansion deformation so that the expanded portion of the swage projection 112 (the upper end portion) is held in engagement with the rim of the opening of the swage hole 54. By so doing, the output shaft 100 is secured by swaging to the oscillation member 48 at one point in the diametrical center. In this way, in the present embodiment, a connecting member for interconnecting the oscillation member 48 and the output shaft 100 is defined by the construction in which the swage projection 112 and the rim of the opening of the swage hole 54 are secured by swaging.

With regard to the superposed faces of the oscillation member 48 and the output shaft 100, the lower face of the connecting base part 50 of the oscillation member 48 constitutes a tapered lower face 114 that progressively slopes downwardly towards its outer peripheral side, while the upper face of the output shaft 100 constitutes an axis-perpendicular upper face 116 that extends in the approximately axis-perpendicular direction. The tapered lower face 114 defines a tapered face that slopes relatively to the axis-perpendicular upper face 116 of the output shaft 100 while defining a curving surface of spherical cap concave shape. The slope angle of the tapered lower face 114 with respect to the axis-perpendicular upper face 116 becomes greater towards its outer peripheral side. Besides, the connecting base part 50 of the oscillation member 48 is larger in diameter than the upper cylindrical portion 104 of the output shaft 100, so that the tapered lower face 114 is larger in diameter than the axis-perpendicular upper face 116. Meanwhile, the upper face of the connecting base part 50 extends in the approximately axis-perpendicular direction, making the connecting base part 50 progressively thinner towards its inner peripheral side.

When the oscillation member 48 and the output shaft 100 are secured by swaging, the tapered lower face 114 of the oscillation member 48 and the axis-perpendicular upper face 116 are superposed against each other vertically in the axial direction. In this respect, the tapered lower face 114 defines a curving surface that slopes with respect to the axis-perpendicular plane and slopes relatively to the axis-perpendicular upper face 116. Accordingly, the tapered lower face 114 and the axis-perpendicular upper face 116 are vertically separated from each other in their inside peripheral portions, so that a tiny gap is formed between the opposed faces of the inside peripheral portions of the tapered lower face 114 and the axis-perpendicular upper face 116. On the other hand, the outer peripheral edge of the axis-perpendicular upper face 116 is positioned in abutment with the diametrical medial section of the tapered lower face 114, thereby providing an abutting portion 118. The abutting portion 118 has an annular shape that extends continuously about the entire circumference, and is provided at the outer peripheral side of the swage hole 54 and the swage projection 112.

Furthermore, after the oscillation member 48 and the output shaft 100 are superposed, the swage projection 112 is secured by swaging to the rim of the opening of the swage hole 54, so that downward force is exerted on the diametrical center section of the oscillation member 48. Consequently, the connecting base part 50 of the oscillation member 48 elastically undergoes bending deformation in the section which is situated between the diametrical center section and the abutting portion 118 in the diametrical direction. By so doing, the connecting base part 50 of the oscillation member 48 is arranged such that the inner peripheral edge of its upper face is pressed against the expanded portion of the swage projection 112 on the basis of its inherent elasticity, while its lower face (the tapered lower face 114) is pressed against the outer peripheral edge of the axis-perpendicular upper face 116 of the output shaft 100.

With the oscillation member 48 and the output shaft 100 secured by swaging so that the oscillation member 48 and the movable member 80 are connected by the output shaft 100, when the coil 82 is energized by the power supply outside (not shown) and axially downward force is exerted on the movable member 80, the output shaft 100 connected to the movable member 80 undergoes displacement downward, so that the oscillation member 48 fastened to the upper end of the output shaft 100 undergoes displacement downward. Then, when energization of the coil 82 by the power supply is ceased, the support rubber elastic body 62, which has been subjected to elastic deformation due to displacement of the oscillation member 48, will exhibit recovery force based on its elasticity, whereby the oscillation member 48, and the output shaft 100 as well as the movable member 80 connected to the oscillation member 48 will be restored to their original position. Therefore, by controlling energization of the coil 82 by the power supply through map control, feedback control, or the like, the oscillation member 48 is oscillated in the vertical direction by the electromagnetic actuator 76, thereby applying a prescribed oscillation force to the intermediate chamber 66. The oscillation force applied to the intermediate chamber 66 will be transmitted to the pressure-receiving chamber 46 via the filter orifice 74, so that vibrations such as idling vibration or driving rumble input to the pressure-receiving chamber 46 will be canceled. Thus, desired active vibration damping effect can be attained.

The engine mount 10 constructed in the above manner has the construction in which the oscillation member 48 and the output shaft 100 are secured by swaging to each other at one point. In this construction, the engine mount 10 includes the abutting portion 118 at which the oscillation member 48 and the output shaft 100 are positioned in abutment with each other, and which is provided at a position away from the swaged section (namely, the connected section) to the outer peripheral side. With this arrangement, a large resistance (securing force) with respect to relative rotation of the oscillation member 48 and the output shaft 100 in the circumferential direction can be obtained based on frictional resistance or the like of the oscillation member 48 and the output shaft 100 at the abutting portion 118. Therefore, even in the case where the oscillation member 48 and the output shaft 100 are formed by forging and their superposed faces are smooth surfaces of negligible irregularity, the oscillation member 48 and the output shaft 100 are positioned in the circumferential direction and prevented from relative rotation.

Moreover, the abutting portion 118 is provided by the outer peripheral edge of the upper cylindrical portion 104 of the output shaft 100 being positioned in abutment with the tapered lower face 114 of the oscillation member 48, at a position appreciably away from the swaged section to the outer peripheral side. Thus, it is possible to more effectively prevent relative rotation of the oscillation member 48 and the output shaft 100, whereby the oscillation member 48 and the output shaft 100 will be more securely interconnected.

Furthermore, in the state where the oscillation member 48 and the output shaft 100 are superposed against each other prior to the swaging, the superposed faces of the oscillation member 48 and the output shaft 100 (the tapered lower face 114 and the axis-perpendicular upper face 116) are positioned in abutment with each other at the abutting portion 118, while being separated from each other in the inner peripheral side of the abutting portion 118. When the oscillation member 48 and the output shaft 100 are secured by swaging at one point in the inner peripheral side of the abutting portion 118, an external load in the downward direction (in the direction of adhesion to the output shaft 100) due to the swaging will be exerted on the inside peripheral portion of the oscillation member 48. Consequently, the connecting base part 50 of the oscillation member 48 is subjected to bending moment in the section that straddles between the swaged section and the abutting portion 118. By so doing, the oscillation member 48 is sufficiently pressed against the output shaft 100 at the abutting portion 118, thereby effectively preventing play or relative rotation of the oscillation member 48 and the output shaft 100.

Additionally, the reinforcing tube part 52 is integrally formed with the outer peripheral edge of the connecting base part 50 of the oscillation member 48 so as to surround the connected section of the oscillation member 48 and the output shaft 100 and project in the thickness direction of the connecting base part 50. Accordingly, the connecting base part 50 is endowed with high rigidity, and hence high shape stability. Therefore, the connected section of the oscillation member 48 and the output shaft 100 will exhibit effective securing force owing to the swaging.

The lower face of the connecting base part 50 of the oscillation member 48 constitutes the tapered lower face 114, while the upper face of the upper cylindrical portion 104 of the output shaft 100 constitutes the axis-perpendicular upper face 116. The tapered lower face 114 and the axis-perpendicular upper face 116 slopes relatively to each other, and the axis-perpendicular upper face 116 is smaller in diameter than the tapered lower face 114, thereby providing the abutting portion 118 of the oscillation member 48 and the output shaft 100. Thus, there is no need to provide a special projecting portion for positioning the oscillation member 48 and the output shaft 100 in abutment with each other at the outer peripheral side of the swaged section. Accordingly, the abutting portion 118 can be provided by the oscillation member 48 and the output shaft 100 of simple structure, thereby obtaining desired securing force.

Besides, the oscillation member 48 and the output shaft 100 are secured by swaging by means of the swage projection 112 integrally formed with the output shaft 100. Therefore, no special components such as screws or headed press-fit pins are necessary for connecting the oscillation member 48 and the output shaft 100, and it is possible to securely connect the oscillation member 48 and the output shaft 100 with a small number of parts. Furthermore, after insertion of the swage projection 112 into the swage hole 54, the distal end portion of the swage projection 112 undergoes diameter expansion deformation. Thus, the swage projection 112 is able to obtain a great resistance to dislodgement from the swage hole 54, thereby firmly securing the oscillation member 48 and the output shaft 100.

Figure 3:
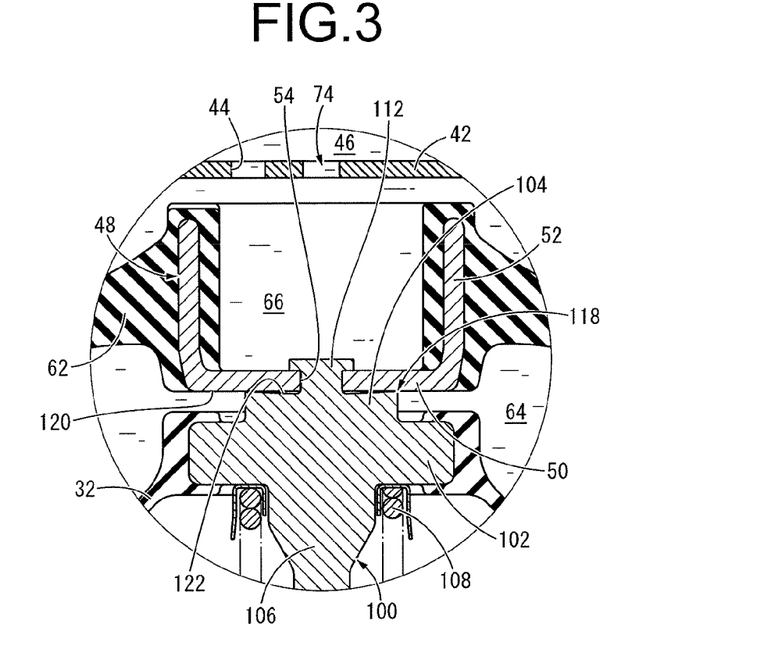
FIG. 3 is a fragmentary enlarged view in axial or vertical cross section of a principle part of an engine mount according to a second embodiment of the present invention.

Referring next to FIG. 3, there is depicted an enlarged principle part of an automotive engine mount according to a second embodiment of a fluid-filled type active vibration damping device constructed in accordance with the present invention. In the following description, components and parts that are substantially identical with those in the first embodiment will be assigned like symbols and not described in any detail. Note that parts that are not depicted in the drawing are analogous to the first embodiment.

Specifically, with respect to the engine mount according to the present embodiment, the lower face of the connecting base part 50 of the oscillation member 48 constitutes an axis-perpendicular lower face 120 that extends in the approximately axis-perpendicular direction. Meanwhile, the upper face of the upper cylindrical portion 104 of the output shaft 100 constitutes a tapered upper face 122 that extends sloping with respect to the axis-perpendicular direction. The tapered upper face 122 defines a sloping face that progressively slopes upwardly towards its outer peripheral side while defining a curving surface of spherical cap concave shape.

The oscillation member 48 and the output shaft 100 are vertically superposed against each other, so that the axis-perpendicular lower face 120 of the oscillation member 48 and the tapered upper face 122 of the output shaft 100 are vertically separated from each other with a gap therebetween in their inside peripheral portions. Besides, the outer peripheral edge of the tapered upper face 122 of the output shaft 100 is positioned in abutment with the axis-perpendicular lower face 120 of the oscillation member 48, thereby providing the abutting portion 118.

Furthermore, with the oscillation member 48 and the output shaft 100 vertically superposed, the swage projection 112 is secured by swaging to the rim of the opening of the swage hole 54, so that downward force is exerted on the diametrical center section of the connecting base part 50 of the oscillation member 48. Consequently, the connecting base part 50 elastically undergoes bending deformation in the section that straddles between its diametrical center section and the abutting portion 118. By so doing, the upper face of the connecting base part 50 is pressed against the expanded portion of the swage projection 112, while the axis-perpendicular lower face 120 of the connecting base part 50 is pressed against the outer peripheral edge of the tapered upper face 122 of the output shaft 100.

Similar to the engine mount 10 according to the first embodiment, the engine mount of this construction according to the second embodiment also has the construction in which the oscillation member 48 and the output shaft 100 are positioned in abutment with each other at the abutting portion 118 provided at the outer peripheral side of the swaged section. With this arrangement, the oscillation member 48 and the output shaft 100 are able to exhibit a large securing force, thereby avoiding relative rotation especially about the center axis.

With respect to the above-described positioning action of the oscillation member 48 and the output shaft 100, it will suffice for the lower face of the connecting base part 50 and the upper face of the upper cylindrical portion 104, which are superposed against each other, to progressively slope relatively to each other towards their outer peripheral side and be positioned in abutment at the outer peripheral side of the swaged section. Therefore, as mentioned above, even in the case where the lower face of the connecting base part 50 constitutes the axis-perpendicular lower face 120 that extends in the axis-perpendicular direction and the upper face of the upper cylindrical portion 104 constitutes the tapered upper face 122 that extends sloping with respect to the axis-perpendicular direction, the desired positioning action (securing action in the rotational direction) will be achieved, as long as the abutting portion 118 is provided.

It should be appreciated that the both of the lower face of the connecting base part 50 of the oscillation member 48 and the upper face of the upper cylindrical portion 104 of the output shaft 100 may slope with respect to the plane surface that extends in the axis-perpendicular direction. Specifically, it could also be acceptable that the lower face of the connecting base part 50 of the oscillation member 48 constitutes the tapered lower face 114 while the upper face of the upper cylindrical portion 104 of the output shaft 100 constitutes the tapered upper face 122, and the abutting portion 118 is provided by the outer peripheral edge of the tapered upper face 122 being positioned in abutment with the tapered lower face 114. This arrangement can also exhibit the same effect as the preceding first and second embodiments.

That is, provided that the lower face of the oscillation member 48 and the upper face of the output shaft 100, which are superposed against each other, slope relatively to each other and are positioned in abutment at the outer peripheral side of the swaged section, either one of them may slope with respect to the axis-perpendicular direction, or alternatively, both of them may slope at different slope angles.

Figure 4:
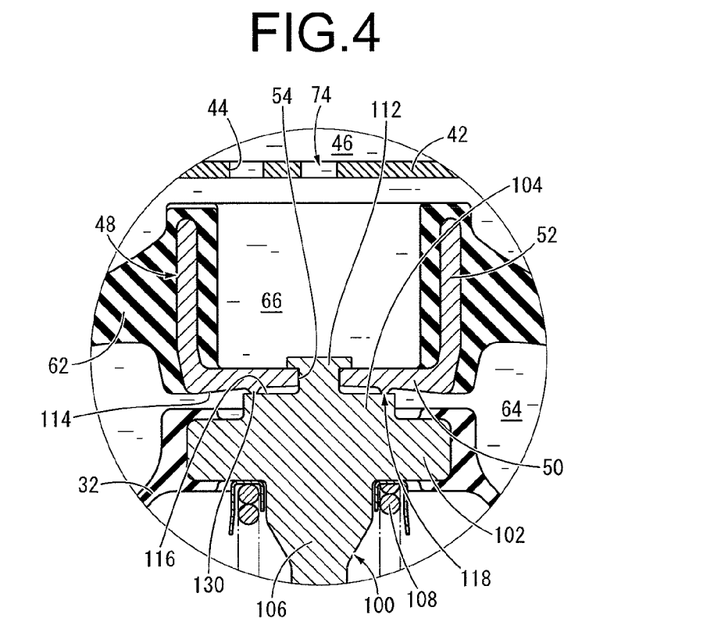
FIG. 4 is a fragmentary enlarged view in axial or vertical cross section of a principle part of an engine mount according to a third embodiment of the present invention.

Referring next to FIG. 4, there is depicted an enlarged principle part of an automotive engine mount according to a third embodiment of a fluid-filled type active vibration damping device constructed in accordance with the present invention. In the present embodiment, similar to the first embodiment, the lower face of the connecting base part 50 of the oscillation member 48 constitutes the tapered lower face 114, while the upper face of the upper cylindrical portion 104 of the output shaft 100 constitutes the axis-perpendicular upper face 116.

Additionally, an abutting projection 130 that projects downward is integrally formed with the connecting base part 50 of the oscillation member 48. The abutting projection 130 is an annular projecting rib that extends continuously about the entire circumference with a substantially semicircular cross section, and is provided at the location which is away from the swage projection 112 as well as the swage hole 54 to the outer peripheral side, and which is superposed against the axis-perpendicular upper face 116 of the output shaft 100.

By the oscillation member 48 and the output shaft 100 being vertically superposed against each other, the abutting projection 130 is positioned in abutment with the outside peripheral portion of the axis-perpendicular upper face 116, thereby providing the abutting portion 118. Note that in the section away from the abutting projection 130, the tapered lower face 114 and the axis-perpendicular upper face 116 are vertically separated from each other with a gap therebetween.

The engine mount as shown in the third embodiment includes the abutting projection 130 that projects downward from the connecting base part 50 of the oscillation member 48, and the abutting projection 130 is positioned in abutment with the axis-perpendicular upper face 116 of the output shaft 100 at the outer peripheral side of the swaged section. With this arrangement, similar to the first and second embodiments, the relative rotation of the oscillation member 48 and the output shaft 100 is prevented based on friction or the like at the abutting portion 118, whereby the oscillation member 48 and the output shaft 100 are effectively positioned.

Moreover, owing to the abutting projection 130, the oscillation member 48 and the output shaft 100 are positioned in abutment in a more stable manner, thereby effectively exhibiting positioning action in the circumferential direction by means of swage fastening.

Figure 5:
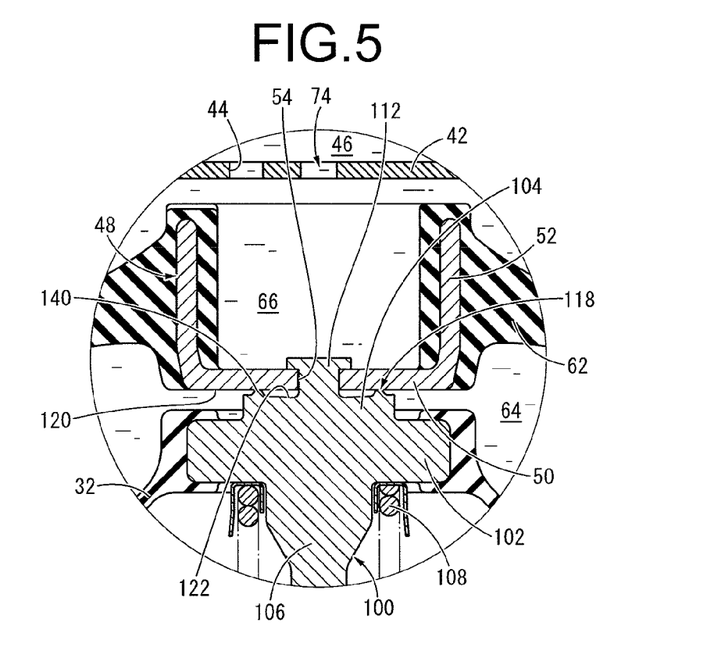
FIG. 5 is a fragmentary enlarged view in axial or vertical cross section of a principle part of an engine mount according to a fourth embodiment of the present invention.

Referring next to FIG. 5, there is depicted an enlarged principle part of an automotive engine mount according to a fourth embodiment of a fluid-filled type active vibration damping device constructed in accordance with the present invention. In the present embodiment, similar to the second embodiment, the lower face of the connecting base part 50 of the oscillation member 48 constitutes the axis-perpendicular lower face 120, while the upper face of the upper cylindrical portion 104 of the output shaft 100 constitutes the tapered upper face 122.

Additionally, an abutting projection 140 that projects upward is integrally formed with the upper cylindrical portion 104 of the output shaft 100. The abutting projection 140 is a projecting rib that extends continuously about the entire circumference with a substantially semicircular cross section, and is provided at the location which is away from the swage projection 112 as well as the swage hole 54 to the outer peripheral side. In the present embodiment, the abutting projection 140 is appreciably separated from the swage projection 112 as well as the swage hole 54 to the outer peripheral side, and projects from the outside peripheral portion of the tapered upper face 122.

By the oscillation member 48 and the output shaft 100 being vertically superposed against each other, the abutting projection 140 is positioned in abutment with the axis-perpendicular lower face 120, thereby providing the abutting portion 118. Note that in the section away from the abutting projection 140, the axis-perpendicular lower face 120 and the tapered upper face 122 are vertically separated from each other with a gap therebetween.

The engine mount of this construction according to the fourth embodiment is also able to exhibit the same effect as in the third embodiment. That is, it will suffice for the abutting projection to project from either one or both of the superposed faces of the oscillation member 48 and the output shaft 100 so as to be positioned in abutment with the other.

It should be appreciated that in the case where at least one of the abutting projections 130, 140 is provided, both of the superposed faces of the oscillation member 48 and the output shaft 100 may be plane surfaces that extend in the axis-perpendicular direction. Specifically, it would also be possible that the lower face of the connecting base part 50 of the oscillation member 48 constitutes the axis-perpendicular lower face 120 while the upper face of the upper cylindrical portion 104 of the output shaft 100 constitutes the axis-perpendicular upper face 116, and the abutting projection is provided to at least one of the axis-perpendicular lower face 120 and the axis-perpendicular upper face 116.

Figure 6:
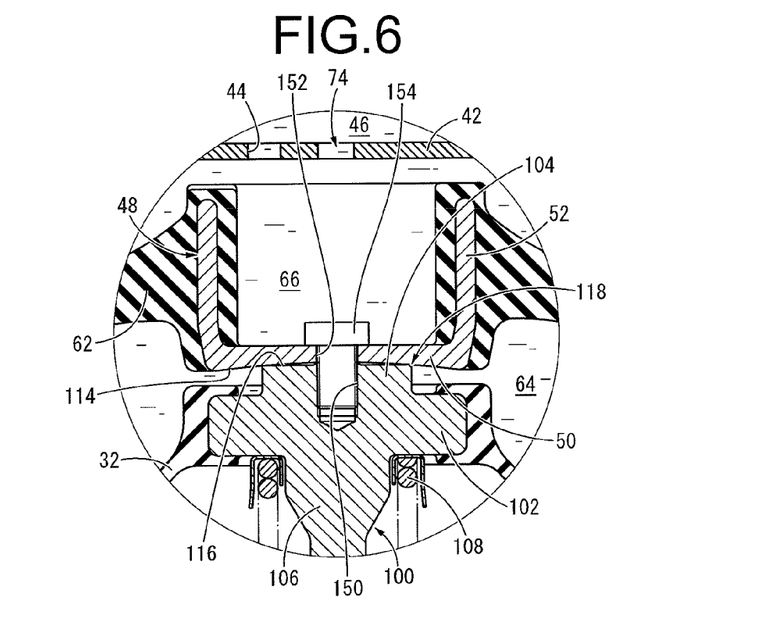
FIG. 6 is a fragmentary enlarged view in axial or vertical cross section of a principle part of an engine mount according to a fifth embodiment of the present invention.

Referring next to FIG. 6, there is depicted an enlarged principle part of an automotive engine mount according to a fifth embodiment of a fluid-filled type active vibration damping device constructed in accordance with the present invention. The engine mount according to the present embodiment has a construction in which the oscillation member 48 and the output shaft 100 are fixed by screwing so as to define the connecting member.

Specifically, the upper end portion of the output shaft 100 includes a screw hole 150 that extends on the center axis and opens onto its upper face. The screw hole 150 is a circular hole with a diameter approximately equal to that of an insertion hole 152 that perforates the connecting base part 50 of the oscillation member 48. A screw thread is formed on the inside peripheral face of the screw hole 150.

The tapered lower face 114 of the oscillation member 48 and the axis-perpendicular upper face 116 of the output shaft 100 are superposed against each other, and the insertion hole 152 of the oscillation member 48 and the opening of the screw hole 150 of the output shaft 100 are positioned. Meanwhile, a screw 154 inserted into the insertion hole 152 from above is threaded onto the screw hole 150. By so doing, the oscillation member 48 and the output shaft 100 are interconnected at one point in the diametrical center.

As described above, the connecting member of the oscillation member 48 and the output shaft 100 is not limited to swage fastening, and it could also be acceptable to utilize fixation by threading the screw 154 onto the screw hole 150. Moreover, relative rotation of the oscillation member 48 and the output shaft 100 is limited based on frictional force or the like obtained at the abutting portion 118. Accordingly, the screw 154 is prevented from getting loose, thereby realizing the stable connection between the oscillation member 48 and the output shaft 100.

It would also be possible to employ a headed press-fit pin instead of the screw 154 and connect the oscillation member 48 and the output shaft 100 by inserting the press-fit pin into the insertion hole 152 of the oscillation member 48 from above and press fitting the same into the hole that opens onto the upper end face of the output shaft 100.

Alternatively, as depicted in a principle part of an engine mount according to a sixth embodiment of the present invention (see FIG. 7), the connecting member for interconnecting the oscillation member 48 and the output shaft 100 may be defined by press fitting a press-fit projection 160 that projects from the output shaft 100 into a press-fit hole 162 that is formed in the connecting base part 50 of the oscillation member 48. Specifically, the press-fit projection 160 has a small-diameter pillar shape with a transverse cross-sectional shape substantially equal to the hole cross-sectional shape of the press-fit hole 162 that perforates the connecting base part 50 of the oscillation member 48, and projects upward on the center axis of the output shaft 100. By press fitting the press-fit projection 160 into the press-fit hole 162 from below, the oscillation member 48 and the output shaft 100 are interconnected in the diametrical center section.

Figure 7:
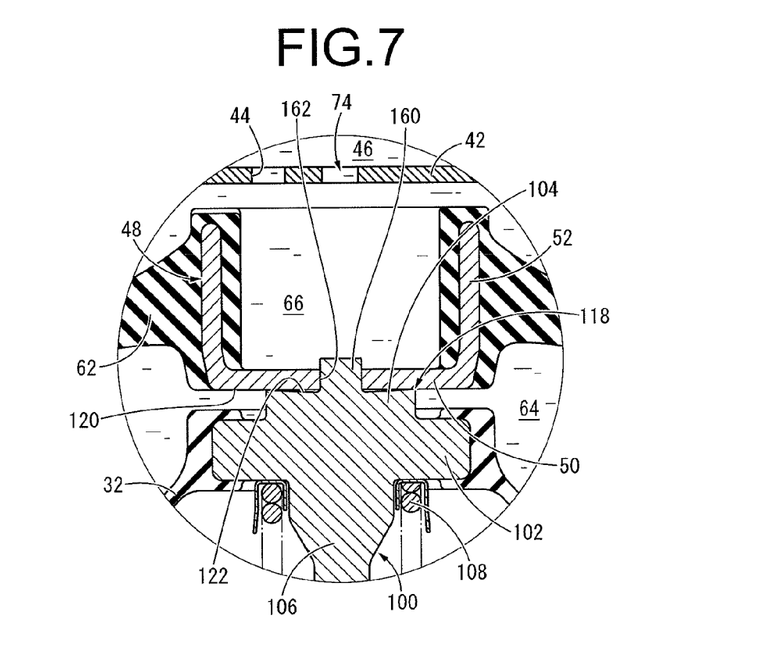
FIG. 7 is a fragmentary enlarged view in axial or vertical cross section of a principle part of an engine mount according to a sixth embodiment of the present invention.

In this way, by employing the press-fit projection 160 integral with the output shaft 100, it is possible to achieve a simple structure with a smaller number of parts, in comparison with the case where the screw or the headed press-fit pin is employed. In addition, there is no need to carry out swaging process (diameter expansion process) of the distal end portion of the press-fit projection 160, whereby the oscillation member 48 and the output shaft 100 can be interconnected through a simple operation.

Note that it could also be acceptable that a press-fit projection is provided to the connecting base part 50 of the oscillation member 48 so as to project downward while a press-fit hole is provided to the output shaft 100 so as to open onto its upper end face. In this case, the oscillation member 48 and the output shaft 100 are interconnected by press fitting the press-fit projection into the press-fit hole from above.

That is, whereas the connecting member of the oscillation member 48 and the output shaft 100 is not limited in particular, it is desirable that the connecting member have the swage-fastening structure or the press-fit-fastening structure which is integrally provided with the oscillation member 48 or the output shaft 100 in order to decrease the number of parts. Furthermore, it is preferable to employ a swaging structure with a detent part in order to avoid dislodgment and realize a stable connection for a long period of time. Note that the screw-fastening structure or the press-fit-fastening structure as described in the fifth and sixth embodiments can be employed in any of constructions according to the first through fourth embodiments in place of the swage-fastening structure.

While the present invention has been described in detail hereinabove in terms of the preferred embodiments, the invention is not limited by the specific disclosures thereof. For example, whereas in the preceding embodiments, the abutting portion 118 is provided continuously about the entire circumference, the abutting portion 118 may be provided partially along the circumference. As a specific example, in the constructions according to the first and second embodiments, either one of the opposed faces of the oscillation member 48 and the output shaft 100 may be endowed with a wave pattern along the circumference, whereby the oscillation member 48 and the output shaft 100 will be positioned in abutment with each other partially along the circumference. Also, for example, in the constructions according to the third and fourth embodiments, the abutting projection 130, 140 may be a projecting rib having a length less than once around the circumference, or alternatively, a projection of semi-spherical shape. The oscillation member 48 and the output shaft 100 are positioned in abutment with each other partially along the circumference thereby. Note that in the case where the abutting projection 130, 140 having the length less than once around the circumference is employed, by providing a plurality of abutting projections along the same given circumference, it is also possible avoid slant or the like when the oscillation member 48 and the output shaft 100 become positioned in abutment by means of the swage fastening.

In addition, no particular limitation is imposed as to the specific shape of the oscillation member 48. For example, it could be acceptable to employ an oscillation member of generally circular disk shape such that the reinforcing tube part 52 is omitted therefrom and is formed only by the connecting base part 50. Another example of the oscillation member that could be employed is the one having an inverted cup shape (namely, a hat shape) or the like as disclosed in Japanese Unexamined Patent Publication No. JP-A-2005-282821 etc.

Besides, the oscillation member 48 need not necessarily be elastically connected with the second mounting member 14 by the support rubber elastic body 62. For example, it would also be possible to employ a structure in which the intermediate chamber 66 and the equilibrium chamber 64 are partitioned by a rigid second partition member, and the second partition member includes an insertion hole that vertically perforates the diametrical center section of the second partition member. In this structure, the oscillation member 48 is inserted into the insertion hole with a tiny gap therebetween, and is capable of oscillating displacement in the vertical direction.

Also, in the first and second embodiments, the connecting base part 50 of the oscillation member 48 is larger in diameter than the upper cylindrical portion 104 of the output shaft 100, so that the outer peripheral edge of the upper cylindrical portion 104 is positioned in abutment with the diametrical medial section of the connecting base part 50. However, it could instead be acceptable that, for example, the connecting base part 50 is smaller in diameter than the upper cylindrical portion 104, and the outer peripheral edge of the connecting base part 50 is positioned in abutment with the diametrical medial section of the upper cylindrical portion 104, thereby providing the abutting portion 118.

Moreover, in the preceding embodiments, the abutting portion 118 is provided by the outer peripheral edge of the upper cylindrical portion 104 of the output shaft 100 being positioned in abutment with the lower face of the oscillation member 48, or otherwise by the abutting projection 130, 140 with a substantially semicircular cross section being positioned in abutment with one of the opposed faces of the oscillation member 48 and the output shaft 100. Thus, the width dimension of the abutting portion 118 in the diametrical direction is made very small. However, the shape of the abutting portion 118 is not limited to such linear one, but may have a sufficient width dimension in the diametrical direction. By so doing, the abutting surface area of the oscillation member 48 and the output shaft 100 becomes larger, thereby advantageously obtaining the positioning action of the oscillation member 48 and the output shaft 100 in the circumferential direction based on friction or the like.

Furthermore, the preceding embodiments include the equilibrium chamber 64 whose wall is partially defined by the flexible film 32, as well as the orifice passage 72 for interconnecting the pressure-receiving chamber 46 and the equilibrium chamber 64. However, the equilibrium chamber 64 may be dispensed with, and hence the orifice passage 72 is not essential. Therefore, while in the preceding embodiments the output shaft 100 also serves as a diaphragm inner fitting that is anchored to the inner peripheral edge of the flexible film 32, it is not always necessary for the flexible film 32 to be anchored to the output shaft 100.

The present invention is not necessarily limited to implementation in an automotive engine mount, and may be implemented for example in an automotive sub-frame mounts, body mounts, differential mounts or the like. Also, the present invention is applicable to any of vibration damping devices for non-automotive various vibrating bodies such as motorized two wheeled vehicles, rail vehicles, industrial vehicles, or the like.

What is claimed is:

1. A fluid-filled type active vibration damping device, comprising:
    a first mounting member;
    a second mounting member;
    a main rubber elastic body connecting the first mounting member and the second mounting member;
    a fluid chamber filled with a non-compressible fluid and adapted to receive input of vibration;
    an oscillation member that partially defines a wall of the fluid chamber;
    an actuator including an output shaft having a longitudinal axis, the output shaft being connected to the oscillation member so that oscillation force generated by the actuator is adapted to be exerted from the oscillation member to the fluid chamber;
    a connecting member that interconnects the oscillation member and the output shaft at one point with the oscillation member superposed against a projecting distal end of the output shaft; and
    an abutting portion provided by a superposed surface of the oscillation member and a superposed surface of the output shaft being positioned in abutment with each other,
    the abutting portion being defined at an outer peripheral side, positioned radially outward of the longitudinal axis of the output shaft, where the oscillation member and the output shaft contact each other,
    the oscillation member and the output shaft being interconnected by the connecting member such that a gap is formed radially inward of the abutting portion and between the superposed surface of the oscillation member and the superposed surface of the output shaft.

2. The fluid-filled type active vibration damping device according to claim 1, wherein the oscillation member includes a swage hole that perforates the oscillation member in an axial direction of the output shaft; the output shaft includes a swage projection that projects from the superposed surface of the output shaft against the oscillation member outward in the axial direction; and the connecting member is constituted such that the swage projection inserted into the swage hole is secured by swaging to a rim of an opening of the swage hole in the axial direction.

3. The fluid-filled type active vibration damping device according to claim 1, wherein the oscillation member includes: a connecting base part of circular disk shape that is superposed against the output shaft; and a reinforcing tube part of round tubular shape that surrounds the projecting distal end of the output shaft and projects in a thickness direction of the connecting base part.

4. The fluid-filled type active vibration damping device according to claim 1, wherein the superposed surface of the oscillation member and the superposed surface of the output shaft slope relative to each other, and the abutting portion is provided such that an outer peripheral edge of one of the superposed surface of the oscillation member and the superposed surface of the output shaft is positioned in abutment with the other of the superposed surface of the oscillation member and the superposed surface of the output shaft.

5. The fluid-filled type active vibration damping device according to claim 1, wherein an abutting projection that projects from one of the superposed surface of the oscillation member and the superposed surface of the output shaft towards the other of the superposed surface of the oscillation member and the superposed surface of the output shaft is provided at the outer peripheral side where the oscillation member and the output shaft contact each other, and the abutting portion is provided such that the abutting projection is positioned in abutment with the other of the superposed surface of the oscillation member and the superposed surface of the output shaft.

6. The fluid-filled type active vibration damping device according to claim 1, wherein at least one of the superposed surface of the oscillation member and the superposed surface of the output shaft is tapered so as to be oriented at an incline with respect to the longitudinal axis of the output shaft.

* * * * *